United States Patent
Goetz et al.

[19]

[11] Patent Number: 6,128,741
[45] Date of Patent: Oct. 3, 2000

[54] COMPACT TRANSPARENT DONGLE DEVICE

[75] Inventors: Rudy Goetz, Huntington Beach; Bahram Afghani, Laguna Niguel; Allan D. Anderson, Cerritos; Patrick N. Godding; Maarten G. Punt, both of Lake Forest, all of Calif.

[73] Assignee: Rainbow Technologies, Inc., Irvine, Calif.

[21] Appl. No.: 09/035,186

[22] Filed: Mar. 5, 1998

[51] Int. Cl.[7] .......................... G06F 11/00; G06F 13/00; G06F 15/00

[52] U.S. Cl. .............................. 713/200; 710/8; 213/164

[58] Field of Search ........................... 710/8, 10, 11, 710/13, 101, 102; 713/200, 201, 202, 164, 165, 166

[56] References Cited

U.S. PATENT DOCUMENTS

| | | | |
|---|---|---|---|
| 4,278,837 | 7/1981 | Best | 178/22 |
| 4,446,519 | 5/1984 | Thomas | 364/300 |
| 4,458,315 | 7/1984 | Uchenick | 364/200 |
| 4,596,898 | 6/1986 | Pemmaraju | 178/22 |
| 4,599,489 | 7/1986 | Cargile | 178/22 |
| 4,634,807 | 1/1987 | Chorley et al. | 178/22 |
| 4,817,140 | 3/1989 | Chandra et al. | 380/4 |
| 4,864,494 | 9/1989 | Kobus, Jr. | 364/200 |
| 5,081,675 | 1/1992 | Kittirutsuneton | 380/4 |
| 5,146,575 | 9/1992 | Nolan, Jr. | 395/425 |
| 5,224,166 | 6/1993 | Hartman, Jr. | 380/50 |
| 5,343,524 | 8/1994 | Mu et al. | 380/4 |
| 5,706,426 | 1/1998 | Hsu | 395/186 |
| 5,742,756 | 4/1998 | Dillaway et al. | 395/186 |
| 5,832,207 | 11/1998 | Little et al. | 395/186 |
| 5,928,362 | 7/1999 | Cardillo et al. | 713/200 |
| 6,009,523 | 12/1999 | Owaki et al. | 713/200 |

OTHER PUBLICATIONS

*NetSENTINEL*™ *Developer's Guide*–Securing the Future of Software, Rainbow Technologies, Inc., Irvine, CA 92718, 1990–1992.

*SentinelScribe*™ *Developer's Guide*–Software Security System, Rainbow Technologies, Inc., Irvine, CA 92718, 1990, pp. 1–79.

*SentinelScout*™ *Developer's Guide*–Software Security System, Rainbow Technologies, Inc., Irvine, CA 92718, 1989, pp. 1–36.

*EVE*™ Developer's Guide–Software Security System, Rainbow Technologies, Inc., Irvine, CA 92718, 1989–1990, pp. 1–72.

*Sentinel C–Plus*™ Developer's Guide –Securing the Future of Software, Rainbow Technologies, Inc., Irvine, CA 92718, 1991, pp. 1–28.

*SentinelShell*™ Developer's Guide–User's Rainbow Technologies, Inc., Irvine, CA 92718, 1987 pp. 1–40.

*Sentinel Pro*™ and Software Sentinel–S™ *Developer's Guide*, –Securing the Future of Software, Rainbow Technologies, Inc., Irvine, CA 92718, pp. 1–108.

*NetSentinel*™ *Developer's Guide*–Developer's Guide, Rainbow Technolgies, Inc., Irvine, CA 92718, 1990–1993, 98 pages.

*MicroSentinelUX*™, *Securing the future of software*–Developer's Guide, Rainbow Technologies, Irvine, CA 92718, 1992; 107 pages.

Primary Examiner—Joseph E. Palys
Assistant Examiner—Nitin Patel
Attorney, Agent, or Firm—Foley & Lardner

[57] ABSTRACT

A compact hardware key for protecting software executing on a computer is disclosed. The hardware key uses a two piece insulator design in which each insulator piece provides a double layer insulator body for protection from tampering, insulator areas for electrically isolating I/O connector pins, and an integral circuit board support portion for securely mounting the circuit board assembly. The compact hardware key also comprises a unique coaxially displaced interrupt pin structure.

22 Claims, 9 Drawing Sheets

COMPACT TRANSPARENT DONGLE DEVICE

BACKGROUND OF THE INVENTION

1. Field of Invention

The present invention relates generally to devices for preventing unauthorized use of software programs, and in particular, a compact, transparent dongle device especially suitable for use with laptop or notebook computers.

2. Description of Related Art

In the last decade, the use of personal computers in both the home and office have become widespread. These computers provide a high level of functionality to many people at a moderate price, substantially surpassing the performance of large mainframe computers of only a few decades ago. This trend is further evidenced by the increasing popularity of laptop and notebook computers, which provide mobile high performance computing power on a mobile basis.

The growing use of computers has resulted in extensive unauthorized use and copying of computer software, costing software developers substantial revenue. Although unauthorized copying of computer software is a violation of the law, the widespread availability of pirated software and enforcement difficulties have limited the effectiveness of this means of preventing software piracy.

Software developers and computer designers alike have sought technical solutions to attack the problem of software piracy. One solution uses an external device called a hardware key, or "dongle," coupled to an input/output (I/O) port of the host computer. One such device is disclosed in U.S. Pat. No. 4,599,489, issued to Cargile on Jul. 8, 1986. The Cargile device executes a prescribed algorithm to produce a code which the computer receives and affords access to the software code if the code is correct. Another such device is disclosed in U.S. Pat. No. 4,446,519, issued to Thomas on May 1, 1984.

While the use of hardware keys is an effective way to reduce software piracy, currently available hardware keys are ill-suited to today's laptop and notebook computers. First, current designs too bulky or improperly shaped to be attached directly to the computer I/O port. This necessitates the use of a separate I/O cable to be attached to the computer. These separate cables require that the hardware key be removed from the computer before storing it in its case, and increase the probability that the hardware key or the interconnecting cable will be damaged. Separate I/O cables also increase the probability that I/O messages relating to the security software routines implemented in the hardware key will be intercepted and perhaps bypassed by an unauthorized software user.

Another problem with current hardware keys is that they occupy a computer I/O port, and prevent that port from being used for computer peripherals, such as printers, scanners, and other I/O devices. This is especially problematic for laptop and notebook computers, because they typically have a fewer I/O ports than desktop computers. Still another problem with current hardware keys is that they are costly to produce, effectively limiting their application to protect high value software.

SUMMARY OF THE INVENTION

There is therefore a need for a secure, compact dongle which can be directly attached to notebook and laptop computers, while still allowing connection between the notebook computer and other computer peripherals. The present invention satisfies that need by providing a secure, compact hardware key using a simple, rugged, two-piece integrated insulator structure and a unique interrupt pin design. Each insulator piece provides a double layer insulator body for protection from tampering, insulator areas for electrically isolating the plurality of I/O connector pins, and a circuit board support portion for securely mounting the circuit board assembly. Since each insulator piece is an integrated structure providing all of the foregoing functionality, the hardware key is easy to attach and remove, small, light, durable, secure, and easy to manufacture. The compact hardware key also includes a coaxially displaced interrupt pin which allows integration of the entire structure in one complete compact package.

The apparatus comprises a circuit board assembly with a plurality of apertures operatively coupled to a processor for performing software security routines, a plurality of pins disposed through the apertures, an interrupt pin having a first portion for operative coupling with the computer I/O port in a first axis and a second pin portion for operative coupling with a peripheral device in the first axis, wherein the second interrupt pin is communicatively coupled to the male portion via the processor in accordance with software security routines.

BRIEF DESCRIPTION OF THE DRAWINGS

Throughout the following, reference numerals will be used in the drawings, and like reference numerals will be used throughout the several views in the description to describe corresponding parts of embodiments of the invention.

DETAILED DESCRIPTION OF THE PREFERRED EMBODIMENT

Figure 1:
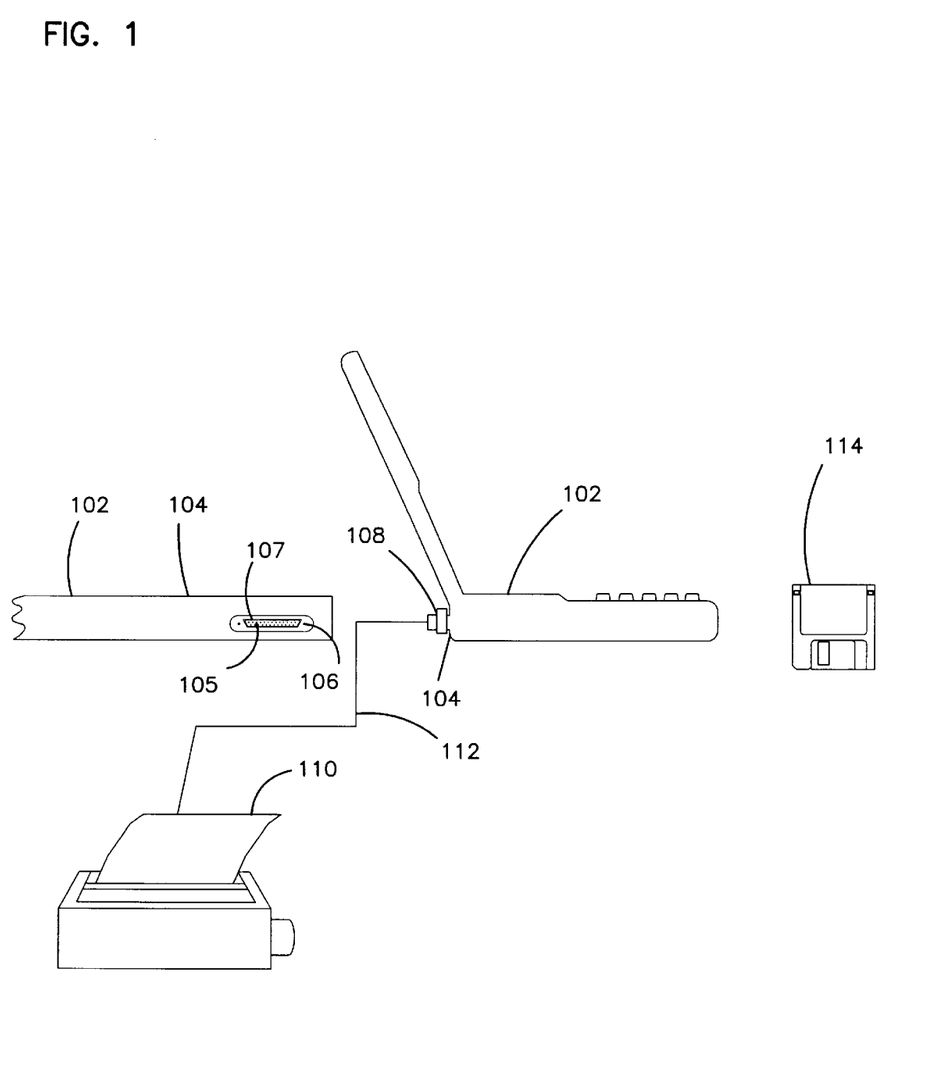
FIG. 1 is a diagram showing use of the compact transparent dongle device with a laptop computer.

FIG. 1 is a diagram showing an overview of the present invention. Computer 102 is used to execute software routines in response to user commands. Computer 102 typically comprises a display for presenting input and output information to the user, a electronic random access memory (RAM) for electronically storing computer instructions and data, a processor for executing computer instructions, a hard disk drive for non-volatile storage of computer instructions and data, and a floppy disk drive for accepting instructions and/or data from a floppy disk 114. Computer 102 may also comprise a read only memory (ROM) device for reading media such as compact disk ROMs (CDROMs).

Computer 102 also comprises an I/O port 104, which allows communication between the computer 102 and peripheral devices such as printer 110 via connecting cable 112. I/O port 104 typically comprises a plurality of computer I/O port apertures 105, which contain connectors which become electrically coupled with suitably configured connectors inserted therein. In one embodiment, the I/O port apertures 105 contain female connectors, and electrical connection is accomplished with the user of male pins. Surrounding the apertures 105, is computer I/O port cladding, or D-shell 107, which assures proper mating orientation between the computer I/O port 104 and connectors from the peripheral devices, and reduces electromagnetic interference. Peripheral device connectors may also be secured to the computer I/O port 104 via threaded apertures 106, which are adapted to securely accept affixing screws from the peripherals.

Figure 2:
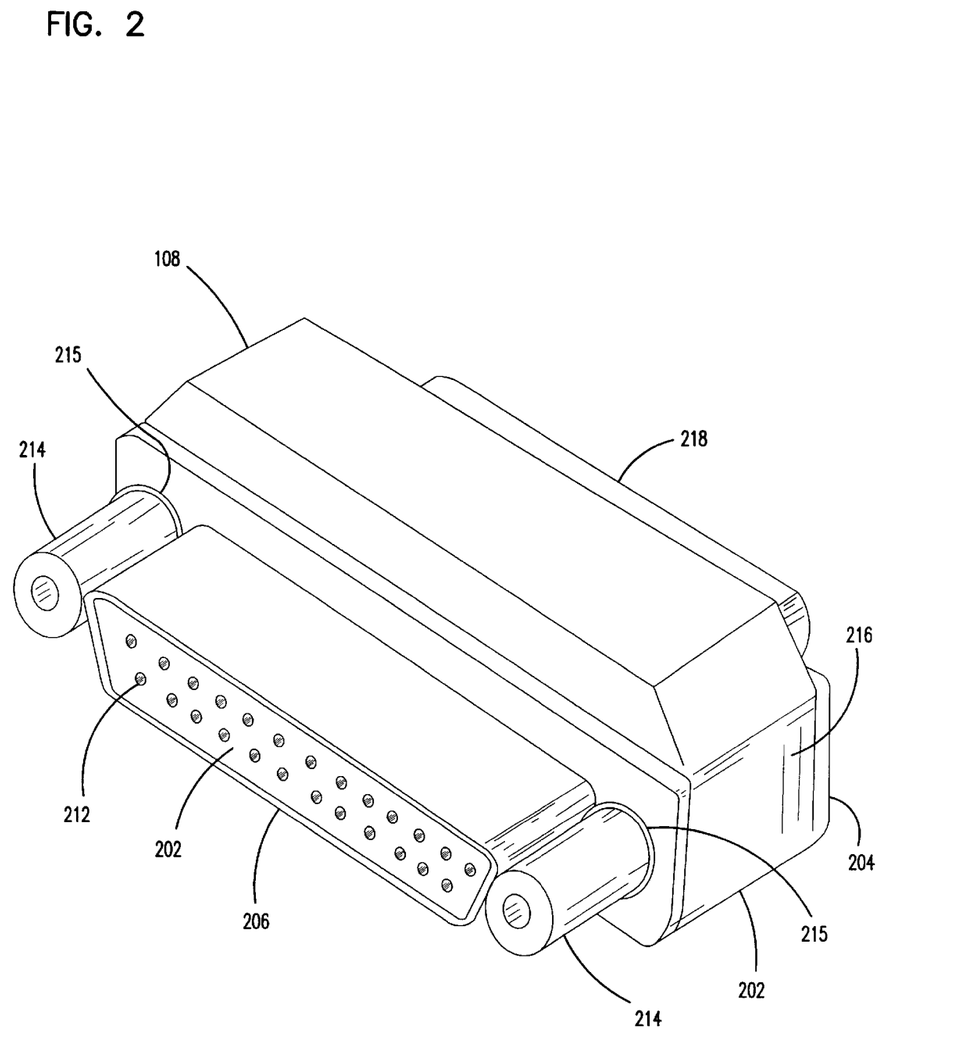
FIG. 2 is a perspective view of the compact transparent dongle device.

FIG. 2 is a perspective view of the hardware key 108. The hardware key 108 comprises a first D-shell 206, which is adapted to be received by a peripheral device, and a second D-shell 208, which is adapted for insertion with the computer I/O port 104 to assure proper orientation and connection between the hardware key elements and the computer I/O port 104. The hardware key 108 also comprises attachment screws 214 for attachment to the computer I/O port 104. The hardware key 108 is transparent in the sense that even when attached to the computer I/O port 104, the hardware key 108 presents an I/0 port to which computer peripherals, such as printer 110 may be coupled. Gripping surface 216 aids in removal of the hardware key 108 from the computer.

Figure 3:
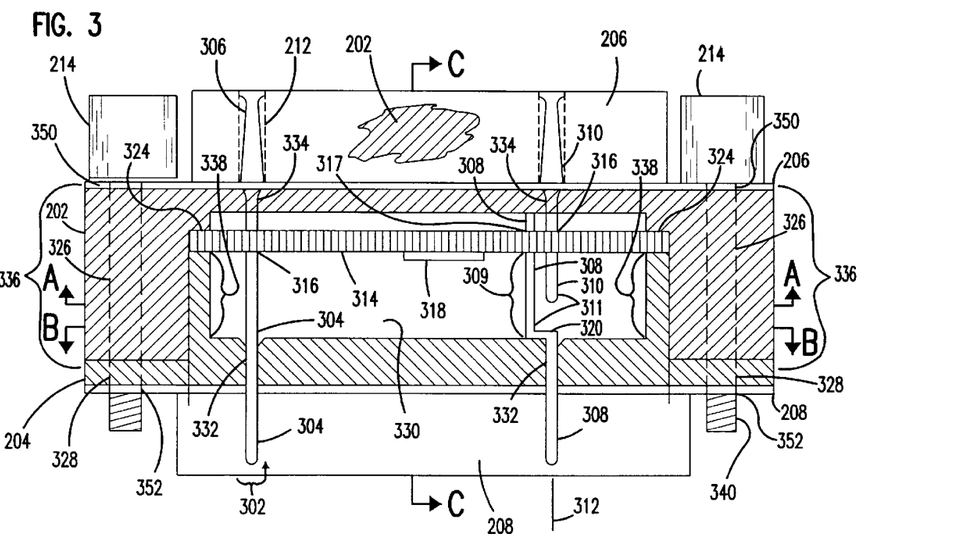
FIG. 3 is top cutaway view of the compact transparent dongle device.
Figure 4:
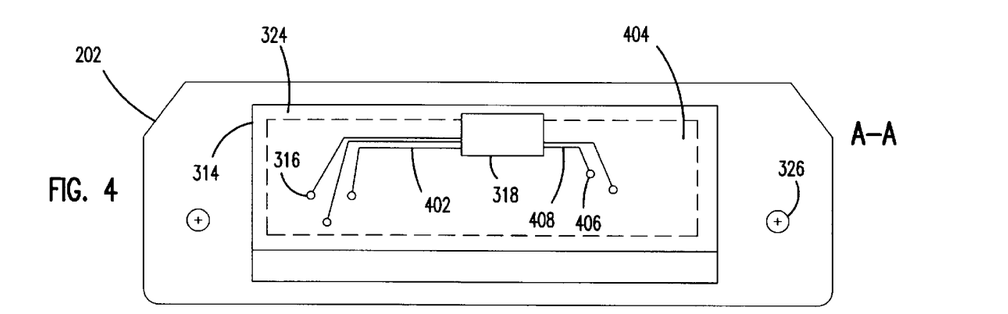
FIG. 4 is a front view of one portion of the compact transparent dongle device.
Figure 5:
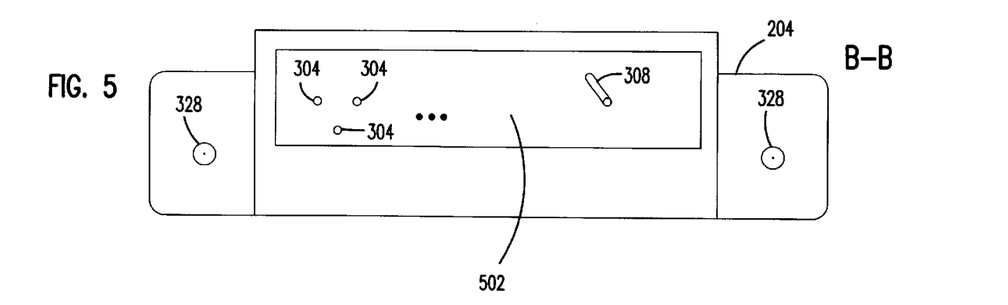
FIG. 5 is a front view of a second portion of the compact transparent dongle device.
Figure 6:
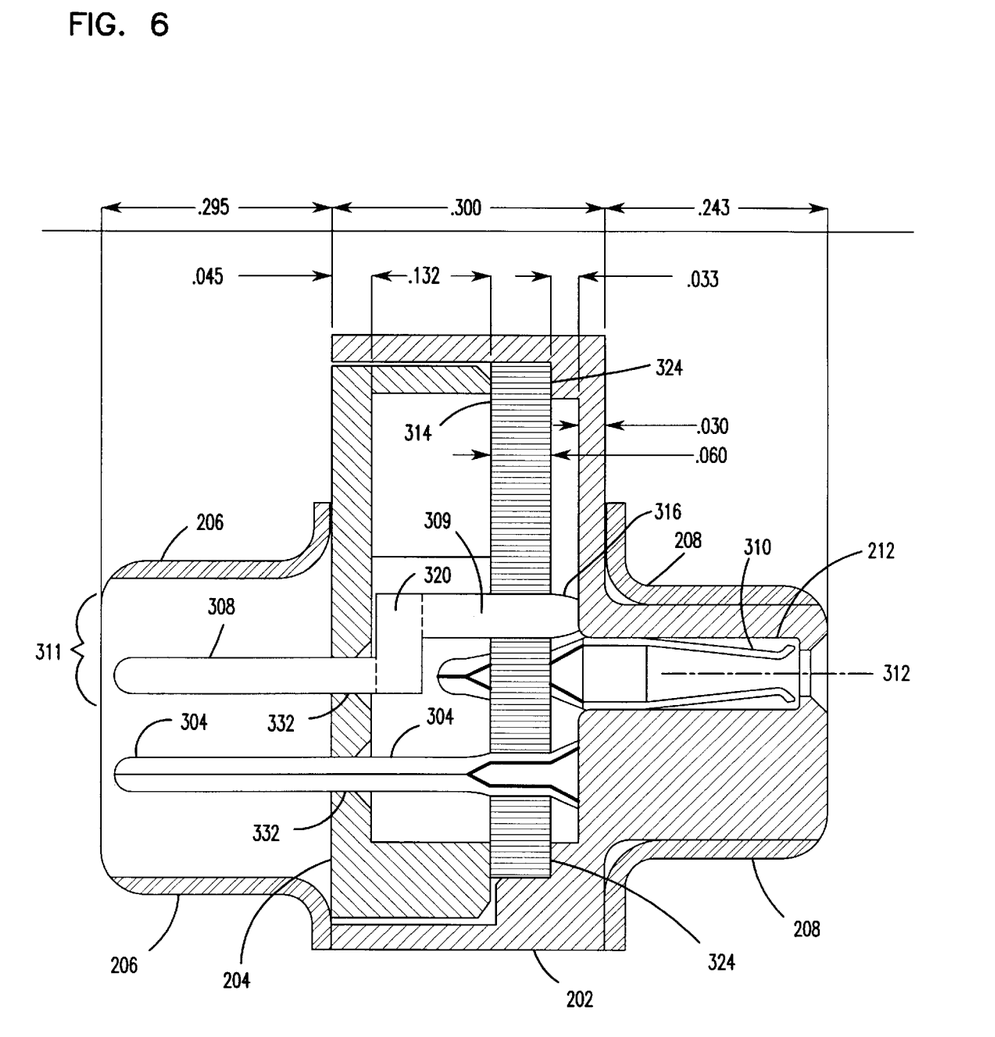
FIG. 6 is a cutaway side view of one embodiment of the compact transparent dongle device.

FIGS. 3, 4, 5, and 6 present various cutaway and disassembled views of the hardware key 108 with FIG. 3 showing a top cutaway view of the hardware key 108, FIG. 4 presenting a front view of the first insulator portion 202 of the hardware key 108, FIG. 5 presenting a front view of the second insulator portion 204 of the hardware key 108, and FIG. 6 showing a cutaway side view of the hardware key 108. The hardware key 108 comprises a circuit board assembly 314 having a plurality of apertures 316 and 317 which are operatively coupled to a processor 318 via conductive paths 402 in the circuit board assembly 314. The processor 318 performs software security routines to prevent unauthorized access to software executing on the computer 102. A plurality of pins 302 are disposed through the apertures 316 in the circuit board assembly 314 to provide electrical communication between the computer I/O port 104 and the processor 318. Pins 302 are typically one piece structures which comprise a first pin portion 304 for operative coupling with the computer I/O port 104, and a second pin portion 306, for operative coupling with a peripheral device such as printer I 10. In the illustrated embodiment, first pin portions 304 are male, and second pin portions 306 are female. Pins 302 can be press-fit into the apertures 316 so as to contact pads or vias at the apertures 316 to provide electrical communication with the circuit board assembly 314. In the illustrated embodiment, pins 302 are one-piece structures formed of folded conductive metal, and the processor 318 is oriented perpendicular to the pins 302.

The hardware key 108 also comprises an interrupt pin 311, which comprises a interrupt pin first portion 308 adapted for operative coupling with the computer I/O port 104 in first axis 312, and a interrupt pin second portion 310 adapted for operative coupling with peripherals such as printer 110 in first axis 312. The interrupt pin second portion 310 is normally electrically isolated from the interrupt pin first portion 308, but the interrupt pin first portion 308 and the interrupt pin second portion 310 may be communicatively coupled via the processor 318 in accordance with software security routines enforced by instructions performed in the processor 318. In the illustrated embodiment, interrupt pin first portion 308 and interrupt pin second portion 310 are structurally separate entities, but need not be so. For example, interrupt pin first portion 308 can be electrically isolated from interrupt pin second portion 310 by an integral substantially non-conductive segment.

In one embodiment, the interrupt pin carries the peripheral "busy" signal. When instructions implementing the software security routines are not active, the processor 318 provides communicative coupling between the interrupt first pin portion 308 and the interrupt pin second portion 310, allowing communication between the computer 102 and the peripheral 110 in the usual manner. When software security routines are active, the "busy" signal is intercepted, and used to pass data used to enforce software security between the hardware key 108 and the computer 102. Interrupt pin 311 could be used for other purposes as well. Further, in some aspects, the present invention can be practiced without the use of the interrupt pin 311.

Interrupt pin first portion 308 comprises an offset portion 309 offset by a connecting portion 320. The offset portion 309 is disposed non-coaxially with the first axis 312 and is communicatively coupled to the processor 318. In the illustrated embodiment, this is accomplished through an offset portion aperture 406 which, by virtue of a pad or via, provides electrical connectivity with a circuit board assembly 314 trace 408 to the processor 318.

The hardware key 108 also comprises a first insulator 202 and a second insulator 204. First insulator 202 and second insulator 204 are of a one piece design which can be molded or extruded from plastic or other material of suitable non-conductivity. First insulator 202 has a plurality of apertures 212 disposed along or parallel to the first axis 312. The plurality of second pin portions 306, which provide electrical communication to peripheral devices are disposed in apertures 212. In the illustrated embodiment, second pin portions 306 are female pin portions, which accept the male pin portions from the peripheral connector. First insulator 202 also comprises apertures 334 sized to accept first pin portions 304 therethrough.

First insulator 202 also comprises a first body portion 336 which defines a first cavity 404 in which the processor 318 is disposed. In one embodiment, the outside surface of the first insulator includes a gripping surface (such as a ridged or serrated surface) which permits easier removal of the hardware key 108 from the computer I/O port 104. The extended first body portion 336 provides a secure, one piece gripping surface for removing the hardware key 108.

First insulator 202 also comprises a ledge 324 for supporting the circuit board assembly 314. The ledge 324 offsets the circuit board assembly 314 from the interior first cavity 404 walls, and when the second insulator 204 is inserted into the first cavity 404 of the first insulator 202, securely holds the circuit board assembly 314 in place. First insulator also comprises first insulator attachment apertures 326 for accepting the threaded portion 340 of attachment screws 214. This allows the hardware key 108 to be affixed to the computer I/O port 104 by rotatably inserting the attachment screws 214 into the threaded apertures 106.

Second insulator 204 comprises a plurality of second insulator apertures 332 disposed parallel to the first axis 312, through which the first pin portions 304 and the first interrupt pin portion 308 are disposed. The second insulator 204 may include a body portion 338. These body portions 338, in conjunction with the first insulator 202 ledge 324 provide a circuit board supporting portion therebetween, when the first insulator 202 and the second insulator 204 are assembled. Using the foregoing teaching, other embodiments using insulators 202 and 204 may be realized in which body portion 338 and ledge 324 cooperatively interact to secure the circuit board assembly 314 in place.

Body portions 338 may, as in the illustrated embodiment, define a second cavity 502. Further, the body portions 338 and other dimensions of the second insulator 204 may also be selected to allow mating insertion with the first insulator 204, so as to form enclosed cavity 330. To further enhance security, enclosed cavity 330 may be filled with an epoxy or other substance to prevent access to the processor 318 or irreparably damage the processor so that the algorithms implemented therein cannot be ascertained by inspection or testing. Second insulator 204 also comprises a second insulator attachment apertures 328 for accepting attachment screws 314.

First insulator D-shell 206, which is sized and shaped to mate with a D-shell from the peripheral connector 112, is affixed to the first insulator 202. In the illustrated embodiment, first insulator D-shell 206 comprises a section perpendicular to the first axis which facilitate attachment to the first insulator 202, and extends with a portion having first D-shell apertures 350 to aid in holding the first insulator D-shell 206 to the first insulator 202. Similarly, second insulator D-shell 208, which is sized and shaped to mate with computer I/O D-shell 107 is affixed to the second insulator 204 in the same way. When assembled, first insulator apertures 326, second insulator apertures 328, first insulator D-shell apertures 350 and second insulator D-shell apertures 352 form a first and second attachment aperture for the assembled hardware key 108, allowing insertion of attachment screws 214, and in one embodiment, affixing rivets 215 that hold the elements of the hardware key 108 together. Affixing rivets 215 are also normally hollow, to allow insertion of attachment screws 214.

Figure 7:
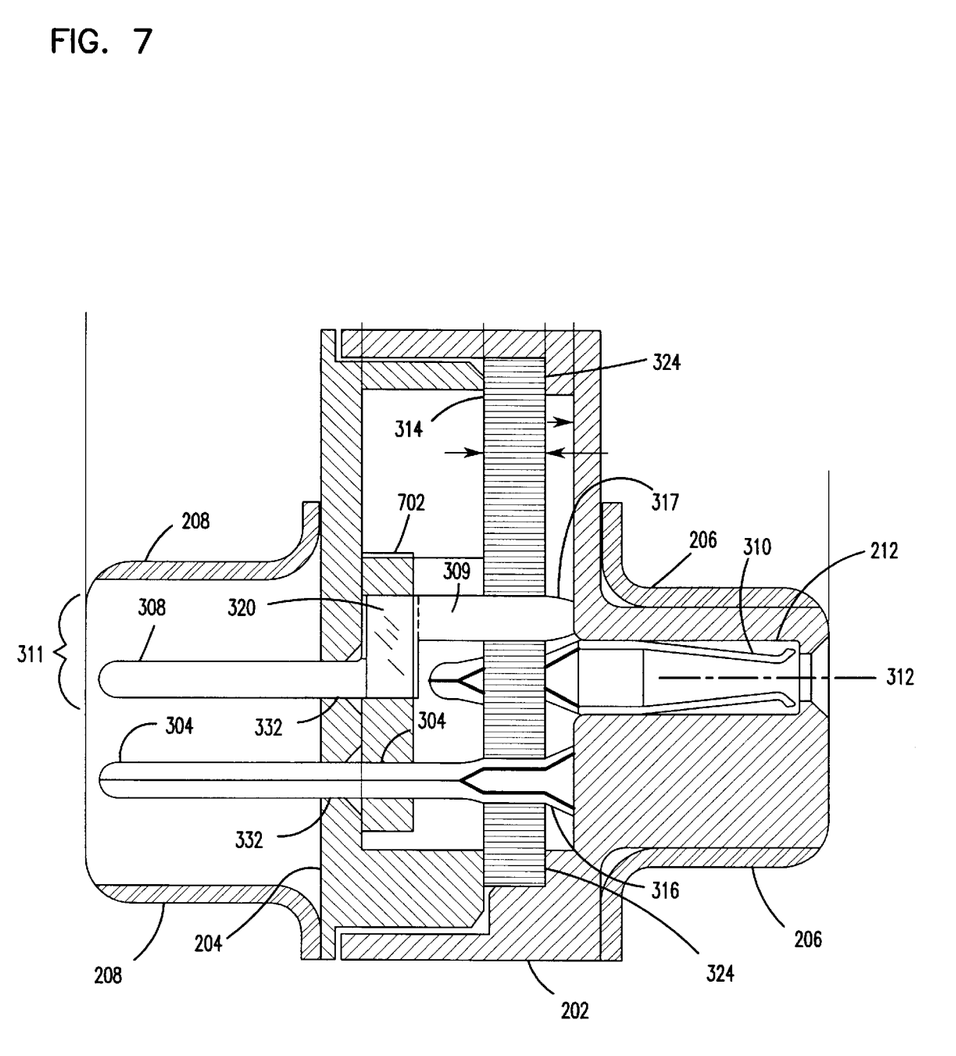
FIG. 7 is a cutaway side view of another embodiment of the compact transparent dongle device.

FIG. 7 is a cutaway view of another embodiment of the present invention. As can be seen from the illustration, the application of pressure in the suitable direction may urge interrupt pin first portion 308 into physical (and consequently, electrical) contact with the interrupt pin second portion 310. To prevent this from occurring under undesirable circumstances, second insulator portion 204 in the embodiment shown in FIG. 7 comprises a second insulator shelf 702. The second insulator shelf 702 forms a structure which, in conjunction with the support provided by aperture 332 inhibits contact between the interrupt pin first portion 308 and the interrupt pin second portion 310, even upon the application of compressive force along the axis of the interrupt pin first portion 308. An illustrative embodiment of this feature is further discussed below with reference to FIGS. 8 and 9.

Figure 8:
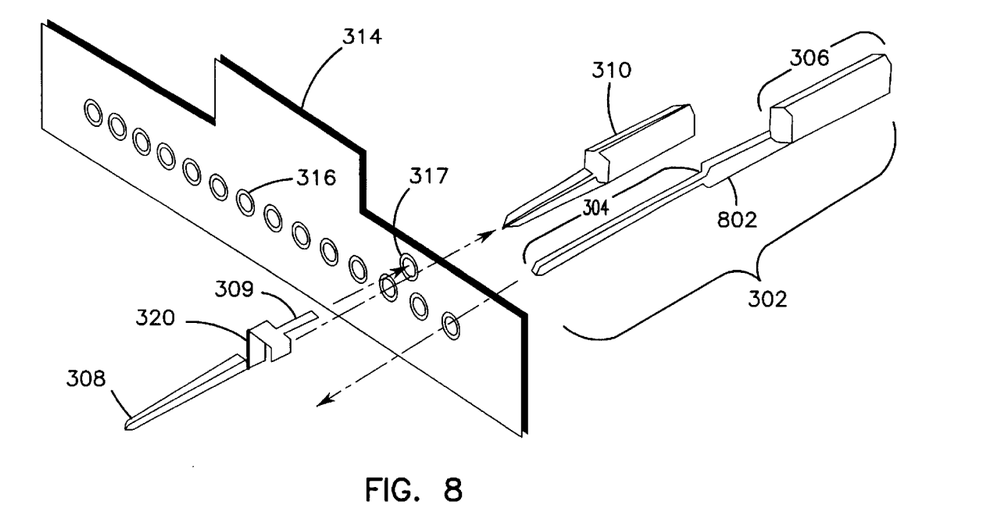
FIG. 8 is a perspective view of the circuit board and pins of the compact transparent dongle device.

FIG. 8 shows a perspective view of the circuit board assembly 314 of the present invention, showing one embodiment of the interrupt pin first portion 308 and second portion 310 as well as pin 302 and its associated components. As described earlier, the circuit board assembly 314 comprises a number of apertures 316, 317 which provide electrical communication with the processor 318.

Pins 302 comprise a first portion 304 and a second portion 306, and are inserted into apertures 316 to effect electrical communication between the pins 302 and the processor 318. In one embodiment, electrical communication between the pins 302 and the circuit board assembly 314 is achieved by center pin portion 802. In one embodiment, pins 302 are formed of rolled spring metal with a slightly greater average diameter than apertures 316, thereby providing for a press-fit between the aperture 316 and the pin 302 to secure the pin 302 in the aperture and establish electrical communication between the pin 302 and the processor 318. The same technique can also be used to assure adequate physical contact between the pin first portion 304 and the electrical contacts in the computer I/O port apertures 105 and between the pin second portion 306 and attached peripheral devices.

In one embodiment of the invention, interrupt pin first portion 308 comprises an offset portion 309, which is inserted into offset circuit board aperture 317, and a connecting portion 320. In the illustrated embodiment, connecting portion 320 is substantially planar and its longer dimensions are oriented along the longitudinal axis of the first interrupt pin portion. Thus, connecting portion 320 resists bending moments applied in the longitudinal axis of the first interrupt pin portion 308 and prevents contact between the interrupt pin first portion 308 and the interrupt pin second portion 310.

Figure 9:
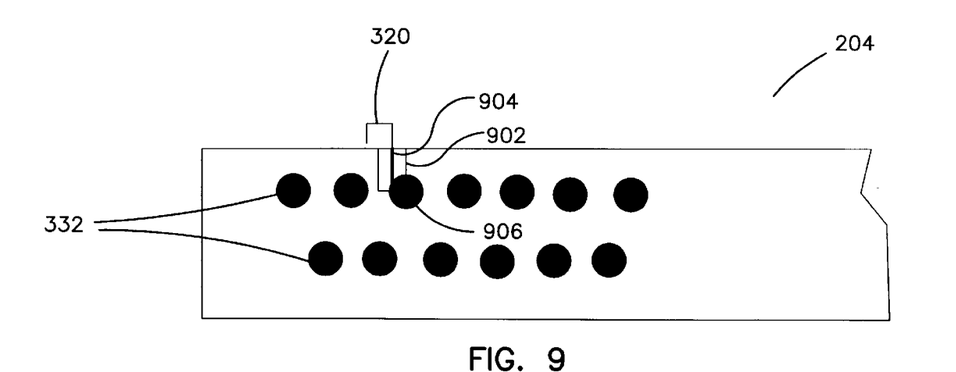
FIG. 9 is an inside view of one of the insulators of the present invention showing a slot for stabilizing the interrupt pin.

FIG. 9 shows a further embodiment of the present invention, which provides further stabilization of the interrupt pin first portion 308 to prevent electrical or physical contact with the interrupt pin second portion 310. In this embodiment, the second insulator portion 204 comprises a slot 902 configured to accept and restrict bending movement of the interrupt pin connecting portion 320, thereby impeding movement of the interrupt pin first portion 308 along its longitudinal axis. To assist in assembly, second insulator portion 204 may comprise guide surfaces 904 to urge the interrupt pin connecting portion 320 into the slot 902. The stabilizing influence of the slot 902 is further enhanced by location adjacent one of the second insulator apertures 332, thus cooperatively using the bottom surface within the second insulator aperture 906 to help resist pin movement in the downward direction, and other unwanted motion. Slot 902 could also be implemented in different shapes than those illustrated, so long as slot 902 restrains movement of the interrupt pin first portion 308 from unwanted movement.

Figure 10:
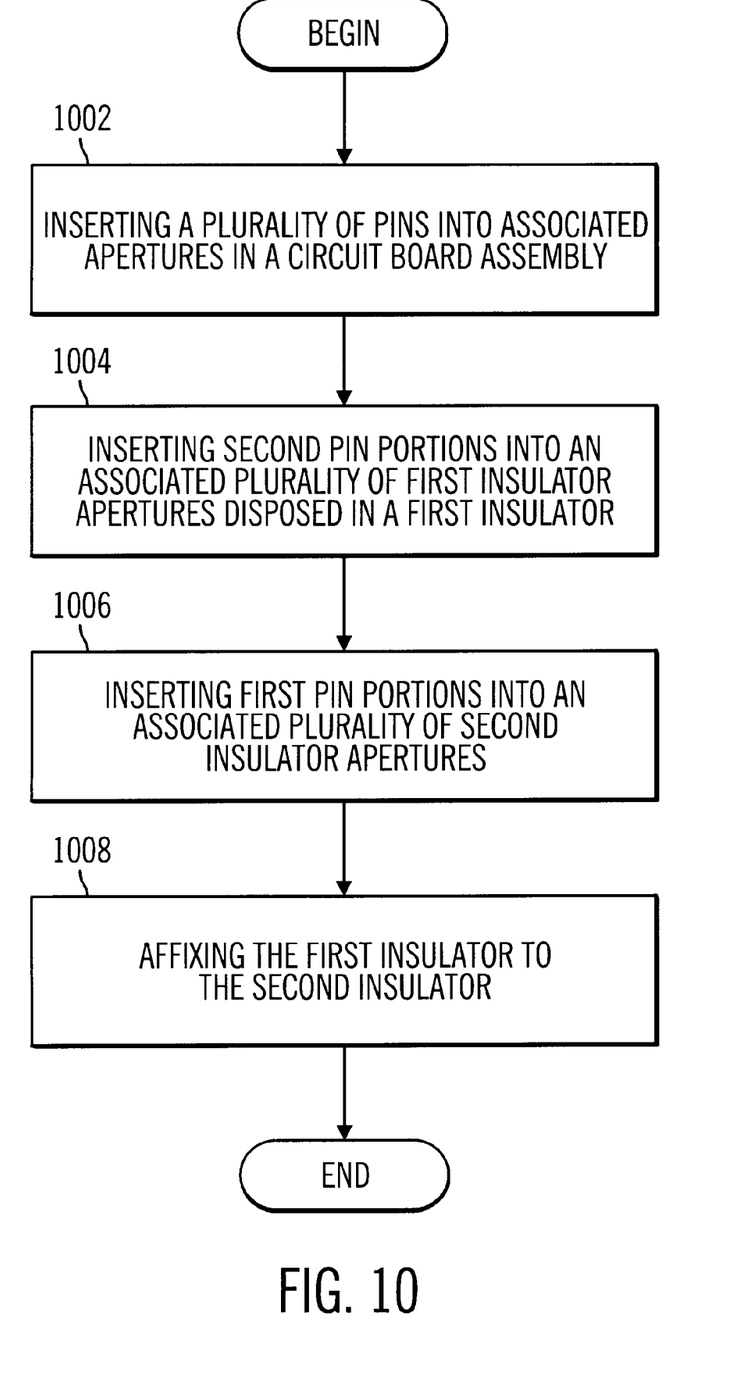
FIG. 10 is a flow chart illustrating the method steps performed in assembling the compact transparent dongle device.

FIG. 10 presents a flow chart illustrating the method steps performed in assembling the compact transparent hardware key 108. The process begins by inserting 1002 a plurality of pins with first pin portions and second pin portions into associated apertures in the circuit board assembly 314. Next, second pin portions are inserted 1004 into an associated plurality of first insulator portion 202 apertures 212. Next, the first pin portions into an associated plurality of second insulator apertures 332. Finally, the first insulator 202 is affixed 1008 to the second insulator 204. Of course, the steps performed before affixing the first insulator 202 to the second insulator 204 with the circuit board assembly 314 inside could be done in different order. For example, the first pin portions can be inserted into the associated plurality of second insulator apertures 332 before the second pin portions are inserted into the first insulator portion apertures 212. In embodiments using an interrupt pin 311 segmented into a physically separate interrupt pin first portion 308 and interrupt pin second portion 310, these portions are inserted into associated apertures in the circuit board assembly 314, as denoted at 317 and 316 in FIG. 3.

Figure 11:
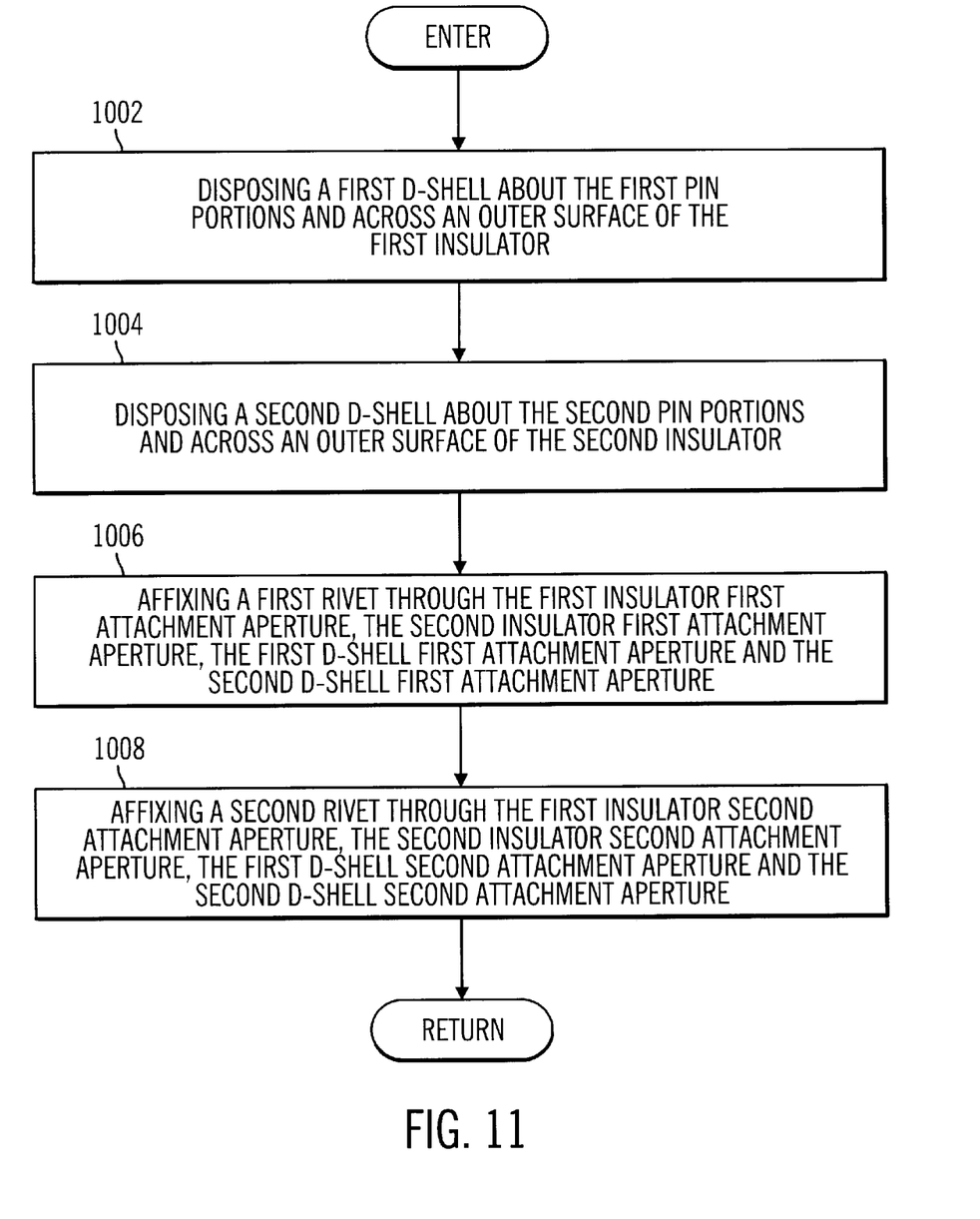
FIG. 11 is a flow chart illustrating the method steps performed to affix the first insulator portion to the second insulator portion.

FIG. 11 presents a flow chart illustrating the steps practiced to affix the first insulator 202 to the second insulator 204. First, a first insulator D-shell 206 is disposed 1102 about the first pin portions and across an outer surface of the first insulator 202. Next, a second insulator D-shell 208 is disposed 1004 about the second pin portions and across an outer surface of the second insulator 204. Then, a first rivet 215 is passed through one of the second insulator D-shell apertures 352, then through the second insulator attachment aperture 328, then through the first insulator attachment aperture 326, and through the first D-shell attachment aperture 350, and affixed 1006. A second rivet similar to first rivet 215 is affixed 1006 in the same manner through the remaining second D-shell second attachment aperture 352, the first D-shell second attachment aperture 350, the second insulator second attachment aperture 328, and the first insulator second attachment aperture 326.

Figure 12:
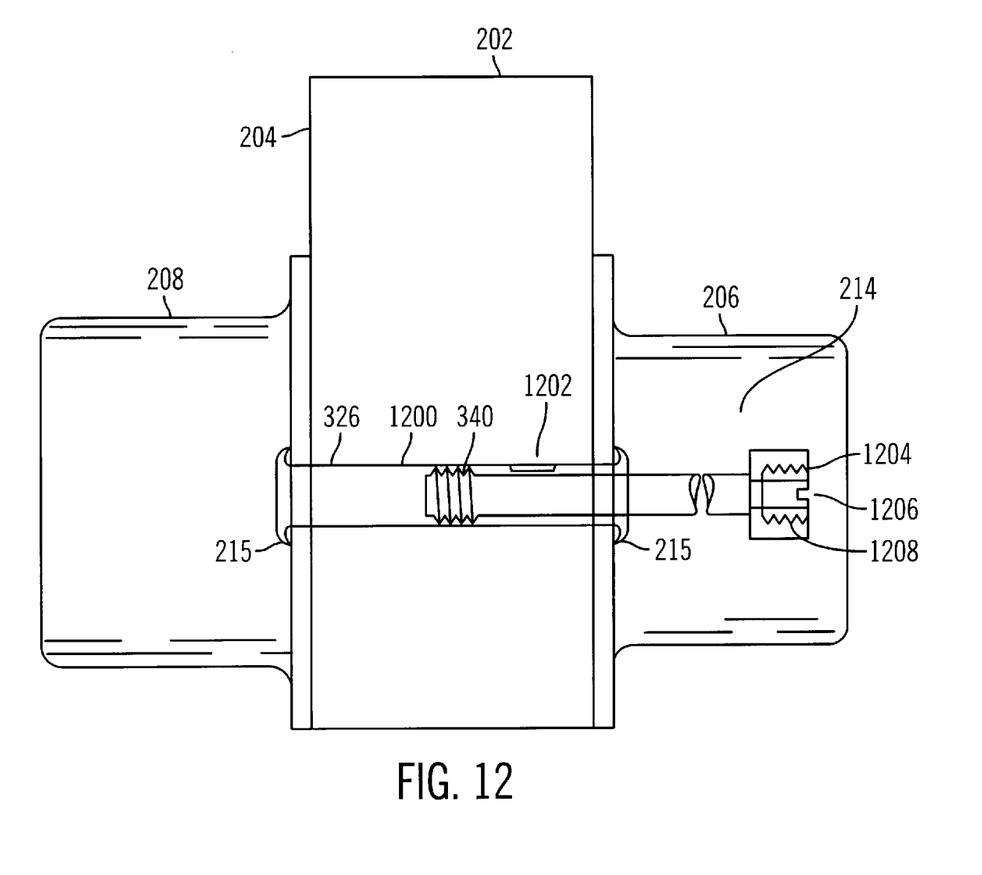
FIG. 12 is a side view of another embodiment of the compact transparent dongle device.

FIG. 12 presents a side view of another embodiment of the present invention, showing the use of a rivet 215 to secure the elements of the compact transparent hardware key 108 device together. Rivet 215 comprises a rivet shaft 1200 with a depressed portion 1202, which extends to within the interior of the rivet. The depth and/or other physical characteristics of the depressed portion 1202 are selected to releasably constrain the attachment screw 214 within the rivet 215. In one embodiment, the depth of the depressed portion 1202 is sufficient to render the interior diameter of the rivet shaft 1200 at that point to be less than the outer diameter of the threaded portion 310 of the attachment screw 214, but greater than the inner diameter of the threaded portion. In this embodiment, the attachment screw 214 cannot be easily pulled from the rivet shaft 1200 interior, but can be removed with an unscrewing motion. In one embodiment, rivet 215 is formed of metal rolled into the rivet's final shape, and depressed portion 1202 is formed by stamping before rolling the metal surface to form the rivet 215.

In one embodiment, attachment screw 214 includes a head with an interior thread 1208 so configured to accept threaded screws to attach other devices to the hardware key 108 Notch 1206 configured to accept a screwdriver-like device and face surfaces 1206 further facilitate removal.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

CONCLUSION

This concludes the description of the preferred embodiment of the invention. In summary, the present invention provides a compact, transparent hardware key using a simple two-piece integrated insulator structure and a unique interrupt pin design. The apparatus comprises a circuit board assembly with a plurality of apertures operatively coupled to a processor for performing software security routines, a plurality of pins disposed through the apertures, an interrupt pin having a first portion for operative coupling with the computer I/O port in a first axis and a second pin portion for operative coupling with a peripheral device in the first axis, wherein the second interrupt pin is communicatively coupled to the male portion via the processor in accordance with software security routines.

What is claimed is:

1. An apparatus for preventing unauthorized use of software executable on a computer having an I/O port, comprising:

a circuit board assembly having a plurality of apertures therethrough, the apertures operatively coupled to a processor for performing software security routines;

a plurality of pins disposed through the apertures to provide electrical communication between the computer I/O port and the processor, each pin having a first pin portion adapted for operative coupling with the I/O port, and a second pin portion adapted for operative coupling with a peripheral device;

an interrupt pin, having an interrupt pin first portion adapted for operative coupling with the I/O port in a first axis, and an interrupt pin second portion electrically isolated from the interrupt pin first portion and adapted for operative coupling with the peripheral device in the first axis; and wherein the second interrupt pin portion is communicatively coupled to the male portion via the processor in accordance with the software security routines.

2. The apparatus of claim 1, further comprising:

a first insulator having a plurality of first insulator apertures disposed substantially parallel to the first axis for accepting the plurality of second pin portions and the second interrupt pin portion;

a second insulator having a plurality of second insulator apertures disposed substantially parallel to the first axis for accepting a plurality of first pin portions and the first interrupt pin portion; and wherein the first and the second insulator form a circuit board supporting portion therebetween.

3. The apparatus of claim 2, further comprising:

a first attachment aperture and a second attachment aperture, each attachment aperture configured to accept a screw adapted for insertion into an computer I/O port threaded aperture; and a rivet disposed through the first attachment aperture.

4. The apparatus of claim 3, further comprising:

a first D-shell, disposed about the first pin portions and extending across an outer surface of the first insulator, the first D-shell comprising a first D-shell first attachment aperture coaxial with the first attachment aperture and a first D-shell second attachment aperture coaxial with the second attachment aperture;

a second D-shell, disposed about the second pin portions and extending across an outer surface of the second insulator, the second D-shell comprising a second D-shell first attachment aperture coaxial with the first attachment aperture and a second D-shell second attachment aperture coaxial with the second attachment aperture; and wherein the first insulator, the second insulator, the first D-shell, and the second D-shell are affixed together via the rivet.

5. The apparatus of claim 4 above, wherein the rivet comprises a depressed portion configured to releasably constrain an attachment screw configured for the computer I/O port threaded aperture within the rivet.

6. The apparatus of claim 5 above, wherein the rivet depressed portion is stamped.

7. The apparatus of claim 2, wherein:

the first insulator further comprises a first body portion defining a first cavity therein, the cavity comprising a ledge adapted to accept the circuit board; and the second insulator further comprises a second body the second insulator body portion adapted for insertion into the first cavity.

8. The apparatus of claim 7 above, wherein the circuit board is affixed by contact between the first body portion and the second body portion.

9. The apparatus of claim 7 wherein the first body portion and the second body portion define an enclosed cavity when the second body portion is mated with the first cavity.

10. The apparatus of claim 7, wherein the first insulator body portion further comprises a gripping surface on the outer surface of the first insulator body.

11. The apparatus of claim 1, wherein the interrupt pin first portion comprises an offset portion disposed non-coaxial with the first axis, the offset portion operatively coupled to the interrupt pin first portion and operatively coupled to the processor via the circuit board.

12. The apparatus of claim 11, wherein:

the interrupt pin first portion and the interrupt pin offset portion are operatively coupled by an interrupt pin connecting portion; and wherein the interrupt pin connecting portion is comprises a substantially planar portion disposed along the first axis.

13. The apparatus of claim 12, wherein the first insulator further comprises a slot configured to accept the interrupt pin connecting portion to impede movement of the interrupt pin first portion along the first axis.

14. The apparatus of claim 13, wherein movement of the interrupt pin first portion along the first axis is further impeded by cooperative interaction between the slot and an adjacent second insulator aperture.

15. The apparatus of claim 1, wherein the interrupt pin carries a busy signal.

16. The apparatus of claim 1, wherein the first pin portion is a male portion and the second pin portion is a female portion.

17. The apparatus of claim 1, wherein each of the plurality of pins are metallic one piece press fit pins.

18. The apparatus of claim 1, wherein the circuit board is oriented substantially perpendicular to the first axis.

19. A method of assembling an apparatus for preventing unauthorized use of software executable on a computer having an I/O port, comprising the steps of:

inserting a plurality of pins into associated apertures in a circuit board assembly, wherein each pin has a first pin portion adapted for operative coupling with the I/O port and a second pin portion adapted for operative coupling with a peripheral device, and the circuit board apertures provide operative coupling between at least one of the pins and a processor for performing software security routines;

inserting the second pin portions into an associated plurality of first insulator apertures disposed in a first insulator;

inserting the first pin portions into an associated plurality of second insulator apertures; and affixing the first insulator to the second insulator.

20. The method of claim 19, further comprising the steps of:

inserting an interrupt pin first portion into an associated interrupt pin first portion aperture in the circuit board assembly; and inserting an interrupt pin second portion into an associated interrupt pin second portion aperture in the circuit board.

21. The method of claim 20, wherein the first insulator comprises a first insulator first attachment aperture and a first insulator second attachment aperture, and the second insulator comprises a second insulator first attachment aperture and a second insulator second attachment aperture, and the step of affixing the first insulator to the second insulator comprises the steps of:

disposing a first D-shell about the first pin portions and across an outer surface of the first insulator, the first D-shell comprising a first D-shell first attachment aperture and a first D-shell second attachment aperture;

disposing a second D-shell about the second pin portions and across an outer surface of the second insulator, the second D-shell comprising a second D-shell first attachment aperture and a second D-shell second attachment aperture;

affixing a first rivet through the first insulator first attachment aperture, the second insulator first attachment aperture, the first D-shell first attachment aperture and the second D-shell first attachment aperture; and affixing a second rivet through the first insulator second attachment aperture, the second insulator second attachment aperture, the first D-shell second attachment aperture and the second D-shell second attachment aperture.

22. A method of preventing unauthorized use of software executable on a computer having a computer I/O port, comprising the steps of:

affixing a hardware key to the computer I/O port, the hardware key comprising a circuit board assembly having a plurality of apertures therethrough, the apertures operatively coupled to a processor for performing software security routines; a plurality of pins disposed through the apertures to provide electrical communication between the computer I/O port and the processor, each pin having a first pin portion adapted for operative coupling with the I/O port, and a second pin portion adapted for operative coupling with a peripheral device; an interrupt pin, having an interrupt pin first portion adapted for operative coupling with the I/O port in a first axis, and an interrupt pin second portion electrically isolated from the interrupt pin first portion and adapted for operative coupling with the peripheral device in the first axis; wherein the second interrupt pin portion is communicatively coupled to the male portion via the processor in accordance with the software security routines; and permitting execution of the software only when indicated by the software security routines.

* * * * *